US 8,650,491 B2

(12) United States Patent
Jia et al.

(10) Patent No.: US 8,650,491 B2
(45) Date of Patent: Feb. 11, 2014

(54) SYSTEM AND METHOD FOR CONFIGURING ENTERPRISE INFORMATION HANDLING SYSTEM STORAGE SOLUTIONS

(75) Inventors: Fenghua Jia, Round Rock, TX (US); Jason Wallis, Round Rock, TX (US); Robert Hayes, Cedar Park, TX (US); Sreenivas Sathyanarayana, Austin, TX (US); Hsinlin Lai, Austin, TX (US); Greg Murray, Round Rock, TX (US); Asmita Phadke, Round Rock, TX (US); Hemant Deshpande, Round Rock, TX (US); Jayavel Somasundaram, Austin, TX (US); Kevin Thex, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 1090 days.

(21) Appl. No.: 11/951,610

(22) Filed: Dec. 6, 2007

(65) Prior Publication Data

US 2009/0150788 A1    Jun. 11, 2009

(51) Int. Cl.
*G06F 15/177* (2006.01)
*G06F 3/00* (2006.01)
*G06F 3/048* (2013.01)

(52) U.S. Cl.
USPC .......................... 715/735; 715/705; 715/764

(58) Field of Classification Search
USPC ....................................................... 715/735
See application file for complete search history.

(56) References Cited

U.S. PATENT DOCUMENTS

| | | | |
|---|---|---|---|
| 5,500,934 A * | 3/1996 | Austin et al. ................. | 715/853 |
| 5,831,610 A * | 11/1998 | Tonelli et al. ................ | 715/735 |
| 6,407,756 B1 * | 6/2002 | Sontag et al. ................ | 715/771 |
| 6,772,204 B1 * | 8/2004 | Hansen ........................ | 709/220 |
| 6,990,649 B2 | 1/2006 | Claras | |
| 7,062,719 B2 * | 6/2006 | Zirojevic et al. ............ | 715/771 |
| 7,171,624 B2 * | 1/2007 | Baldwin et al. ............. | 715/734 |
| 7,219,300 B2 * | 5/2007 | Arquie et al. ................ | 715/736 |
| 7,315,985 B1 * | 1/2008 | Gauvin et al. ............... | 715/734 |
| 7,539,836 B1 * | 5/2009 | Klinkner ...................... | 711/170 |
| 7,581,130 B2 * | 8/2009 | Carroll et al. ............... | 713/340 |
| 2003/0229739 A1 * | 12/2003 | Brewer et al. ............... | 710/105 |
| 2006/0246788 A1 | 11/2006 | Ewing | |
| 2006/0248323 A1 * | 11/2006 | Ewing et al. .................... | 713/1 |
| 2007/0032207 A1 * | 2/2007 | Shah .............................. | 455/111 |
| 2007/0067731 A1 * | 3/2007 | Hiroi et al. ................... | 715/765 |
| 2007/0245255 A1 * | 10/2007 | Galgano ....................... | 715/764 |
| 2008/0172480 A1 * | 7/2008 | Agrawal et al. ............. | 709/221 |
| 2009/0083019 A1 * | 3/2009 | Nasle ............................. | 703/18 |
| 2009/0083484 A1 * | 3/2009 | Basham et al. .............. | 711/114 |

* cited by examiner

*Primary Examiner* — Stephen Alvesteffer
(74) *Attorney, Agent, or Firm* — Terrile, Cannatti, Chambers & Holland, LLP; Robert W. Holland

(57) ABSTRACT

Enterprise information handling system storage solutions are configured automatically through a graphical user interface that accepts storage device and storage topology selections from an end user to automatically present a graphical image depicting interconnection devices that interface the storage devices. For example, cables with a color selected by the end user are depicted interfacing storage devices with the selected color. In one embodiment, switches are automatically selected and depicted for the storage devices and storage topology selected by the end user.

15 Claims, 5 Drawing Sheets

SYSTEM AND METHOD FOR CONFIGURING ENTERPRISE INFORMATION HANDLING SYSTEM STORAGE SOLUTIONS

BACKGROUND OF THE INVENTION

1. Field of the Invention

The present invention relates in general to the field of information handling system interactions, and more particularly to a system and method for configuring enterprise information handling system storage solutions.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Business enterprises have come to rely upon information handling systems in order to perform enterprise functions in an effective and efficient manner. One result of the growing reliance of enterprises on information handling systems is that enterprises have generated and continue to generate large quantities of information for storage. In response to increased enterprise storage needs, industry has developed a variety of storage solutions that store information on networked storage devices, such as networked hard disk drives. Generally, enterprises prefer storage solutions that are scalable so that additional storage is added as needed and that provide rapid recovery of information from storage when the information is needed. Another feature commonly sought by enterprises is redundancy, such as by keeping multiple copies of information within a storage solution so that failure of any one storage device will not make information inaccessible. One type of solution often preferred by enterprises is a storage area network (SAN). SANs are often interfaced with Fibre channel cables that provide for rapid communication of information between storage devices through host bus adapters (HBAs), Fibre channel switches and disk or storage processor enclosures (DPEs or SPEs).

One difficulty that enterprises face in setting up and using storage solutions is configuring components of a storage solution in a compatible manner. For example, different combinations of HBAs, switches, DPEs and SPEs call for different types of cables for connecting devices. Often, when ordering a storage solution, end users have confusion about the types of components to select and how the selected components will interconnect. The overall storage solution is often difficult for end users to visualize since storage solutions often include large numbers of components. In the event that an end user purchases incompatible components, such as incorrect cables, the end user often places responsibility for the incompatible components on the information handling system manufacturer. Even with active manufacturer input to the components purchased by an end user, mistakes still happen since manual selection and mapping of multiple components is a tedious process prone to errors.

SUMMARY OF THE INVENTION

Therefore a need has arisen for a system and method which aids end user configuration of information handling system storage solutions from a plurality of components.

In accordance with the present invention, a system and method are provided which substantially reduce the disadvantages and problems associated with previous methods and systems for configuration of storage solutions. Selections of storage devices by an end user are analyzed to determine a valid interconnection for the storage device. A graphical image of the interconnected storage devices is presented for the end user.

More specifically, an interconnection engine receives end user selections of storage topologies, storage devices and interconnection devices and analyzes the selections to automatically generate a valid storage solution. Storage topologies include direct attached storage, non-redundant storage area networks, and redundant storage area networks. Storage devices include storage servers and hard disk drives configured to interconnect with various cables, such as by fibre channel, Ethernet, or Serial Attached SCSI (SAS) cables. Interconnect devices include cables and switches having ports compatible with the various types of cables. In one embodiment, the end user has an option to select specified cable types and lengths with a particular color so that a user interface depicts the storage solution with the selected cable color. SKU codes are associated with the storage and interconnect devices so that the user interface is able to present an order and quote for the storage solution as configured by the end user.

The present invention provides a number of important technical advantages. One example of an important technical advantage is that end users are able to configure information handling system storage solutions with little or no manufacturer help. Only cables compatible with selected components are included with the components. Further, a graphical depiction of the storage solution is automatically created so that the end user can view an interconnected diagram of correctly-configured components. This simplifies end user purchases of storage solutions and provides a favorable end user experience with decreased risk that storage solutions will ship with incompatible components.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Storage device interconnections For information handling system networks are automatically configured and presented based on end user storage device and storage topology selections. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
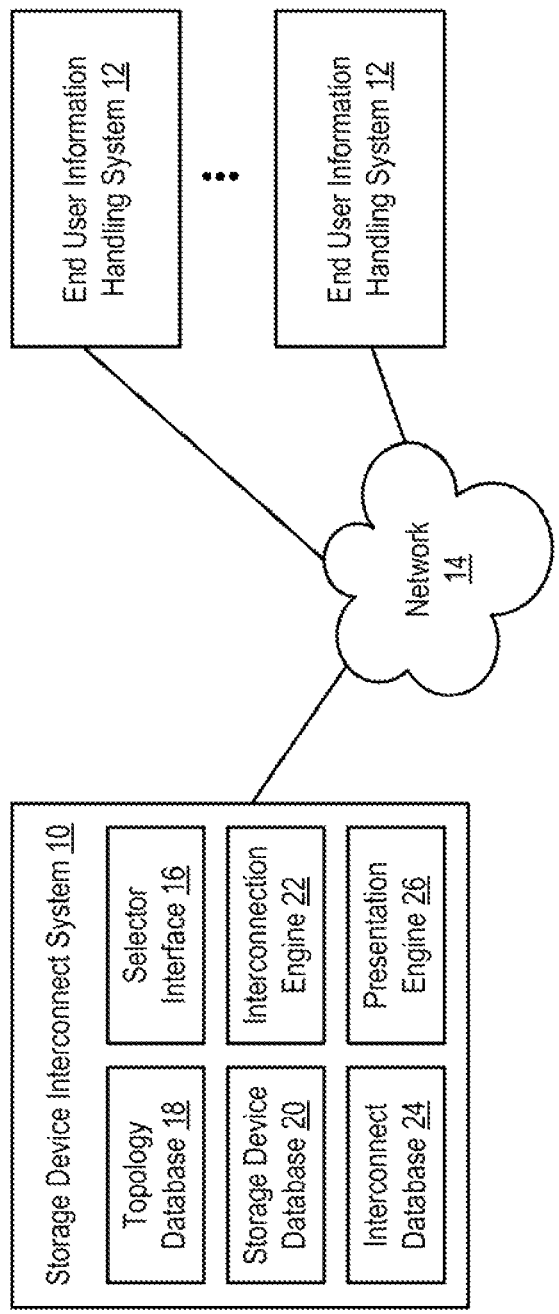
FIG. 1 depicts a block diagram of a storage device interconnect system.

Referring now to FIG. 1, a block diagram depicts a storage device interconnect system 10 that automatically configures and presents interconnections for selected storage devices and storage topologies. End user information handling systems 12 interface with storage device interconnection system 10 through a network 14, such as a LAN or the Internet. A selector interface 16 accepts end user selections of storage devices and storage topologies. For example, a topology database 18 maintains a list of plural available storage topologies and associated configuration information and a storage device database 20 maintains a list of plural available storage devices and associated configuration information. End user storage topology and storage device selections are provided to an interconnect engine 22 which automatically applies the selections to determine interconnection devices for interfacing the selected storage devices according to the selected storage topology. For example, an interconnect database 24 stores a list of available interconnect devices and associated configuration information for interconnect engine 22 to apply to determine interconnect devices for a selected storage topology and selected storage devices. Once interconnection engine 22 configures interconnects in the selected storage topology, a presentation engine 26 presents a graphical user interface that depicts the selected storage devices in the selected topology with the determined interconnect devices.

Storage device interconnect system 10 is a tool that allows an end user to order an enterprise storage system with an automatically generated valid configuration. For example, stock keeping unit (SKU) codes associated with interconnection devices are automatically retrieved and added to end user selections of storage devices to allow generation of an order or quote for the storage solution. Examples of storage topologies include Direct Attached Storage (DAS), non-redundant Storage Area Networks (SAN) and redundant Storage Area Networks. Storage devices include hard disk drives that are housed in modular disk array enclosures and may be attached to Disk Processor Enclosures (DPE) or Storage Processor Enclosures (SPE) and host servers that include ports for Fiber Channel or iSCSI network connectivity. Interconnect devices include cables and switches used to interconnect the storage devices. An end user may select all devices for a valid configuration or may select storage devices and allow automatic generation of a configuration with interconnect devices. For example, an end user may select cable types and cable lengths with a selected cable color for use in the automated generation of cables in the required quantity for interconnecting the selected hosts and storage. As another example, the end user may select a topology, such as redundant or non-redundant SAN topologies to have a correct number of switches automatically presented for the selected storage devices. Presentation engine 26 depicts the selections and the automatically generated interconnect devices in a proper configuration, including cables with colors as selected by the end user.

Figure 2:
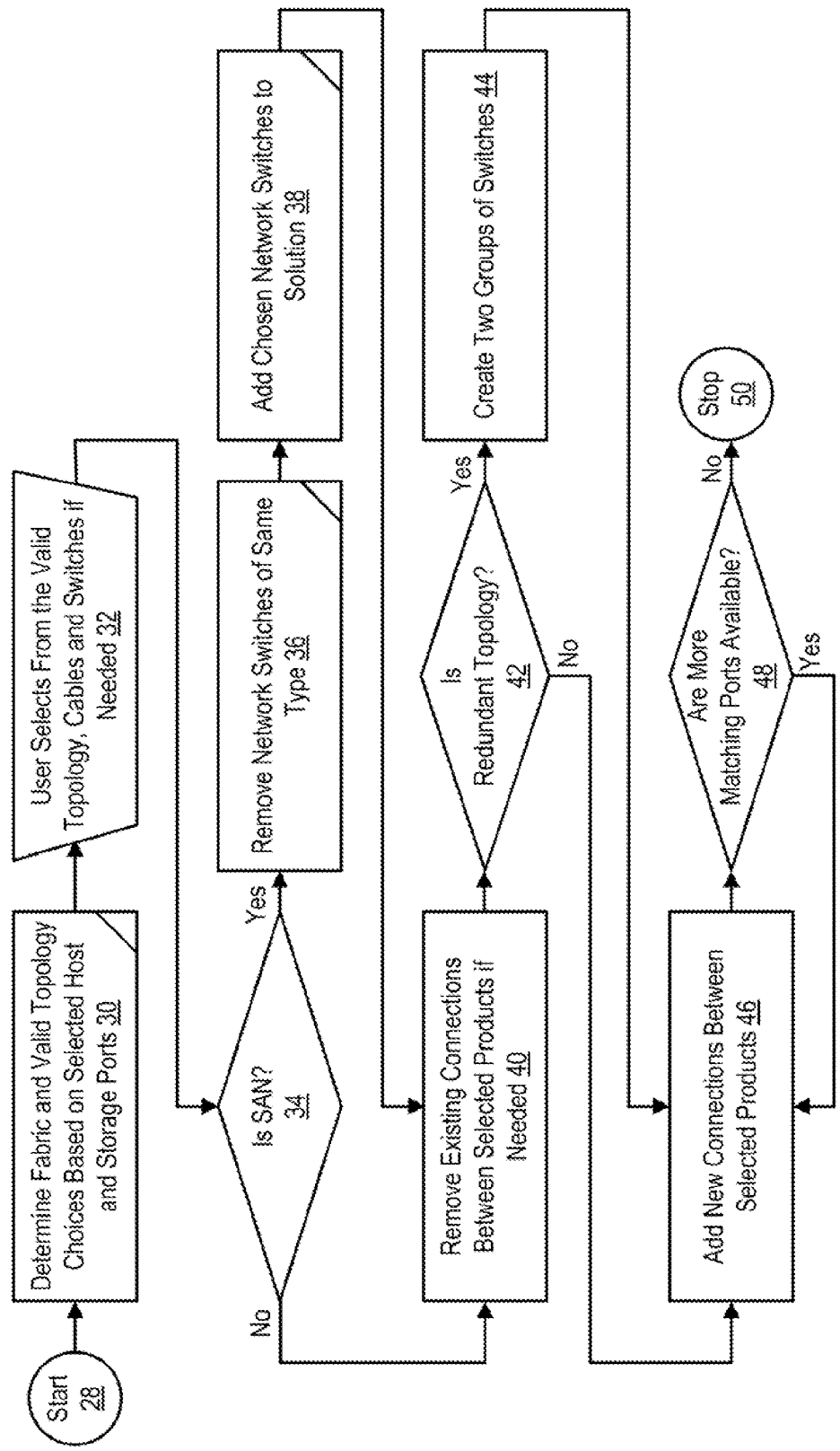
FIG. 2 depicts a flow diagram of a process for determining and presenting storage interconnect configurations.

Referring now to FIG. 2, a flow diagram depicts a process for determining and presenting storage interconnect configurations. The process begins at step 28 at proceeds to step 30 to determine the interconnect fabric and a valid topology choices based upon the storage device host and its associated storage ports. At step 32, an end user selects from the available valid topologies, cables and switches as needed or desired. At step 34, the end user's selections are analyzed to determine if the selected topology is a storage area network. If so, the process continues to step 36 to remove network switches of the same type and to step 38 to add network switches selected by the end user. From step 38, or from step 34 if not a SAN, the process continues to step 40 to remove existing connections between selected storage devices as needed, such as if an incorrect connection is added by an end user or an existing device changes. At step 42, a determination is made of whether the topology of the storage solution is a redundant topology. If so, the process continues to step 44 to create two groups of switches in support of the redundancy. From step 44 or step 42 in the case of non-redundancy, the process continues to step 46 to add interconnections between selected devices, such as where device ports remain unused. At step 48, a determination is made of whether additional ports are available and, if so, the process returns to step 46. If no more ports are available for interconnections, the process continues to step 50 to end.

Figure 3:
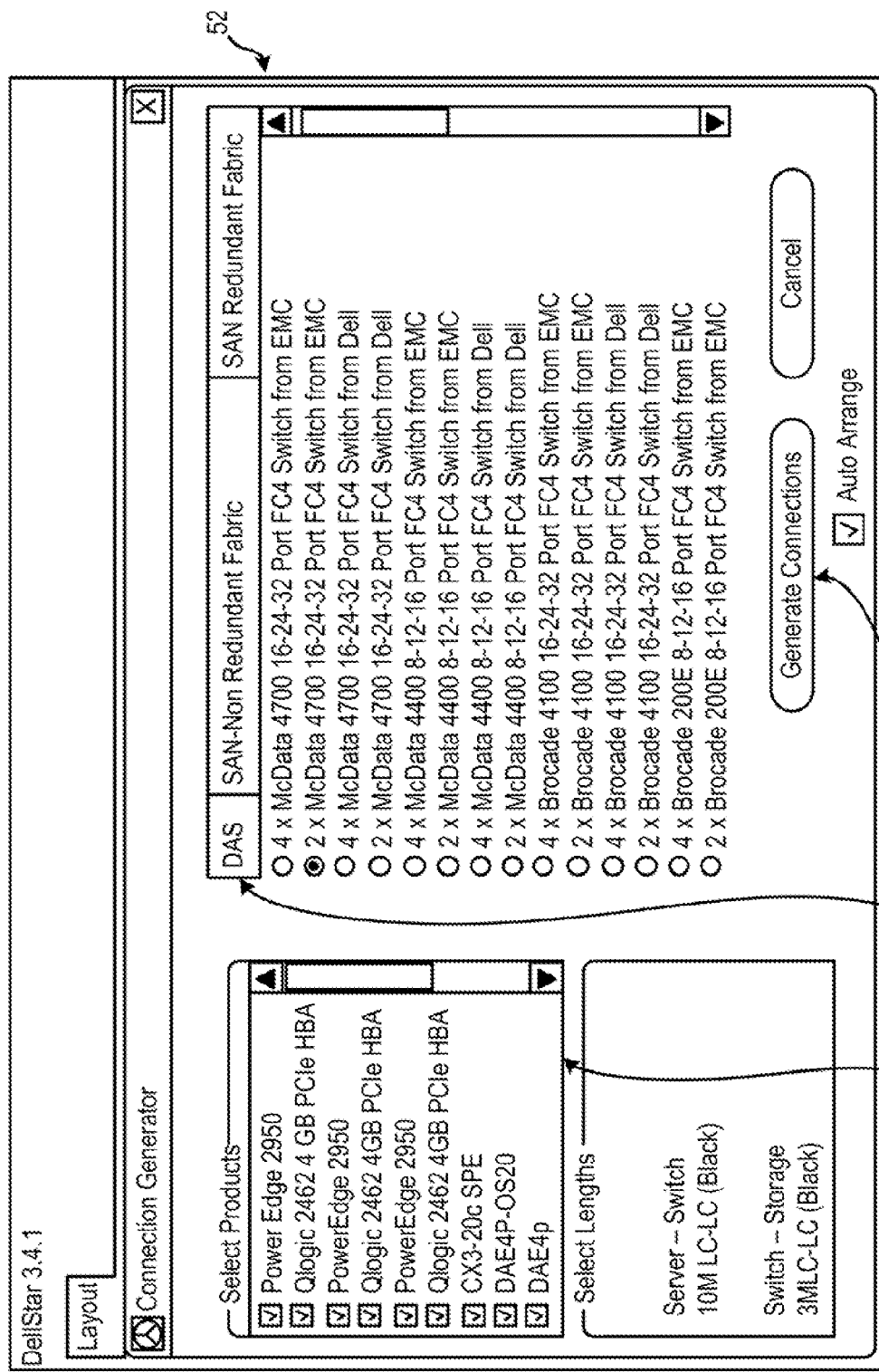
FIG. 3 depicts a graphical user interface for selecting storage devices and storage topologies.

Referring now to FIG. 3, a graphical user interface 52 is depicted for selection of storage devices and storage topologies. An end user selects a desired storage topology with topology tabs 54 to view basic configurations available in each topology. A device box 56 allows an end user to select specific storage devices, such as storage servers or hard disk drives with specified storage processors, as well as specific storage interconnects, such as specific switches or cables. Once an end user selects a desired topology and/or devices, a generate connections button 58 initiates automated generation of interconnections between the selected devices for presentation as a graphical display.

Figure 4:
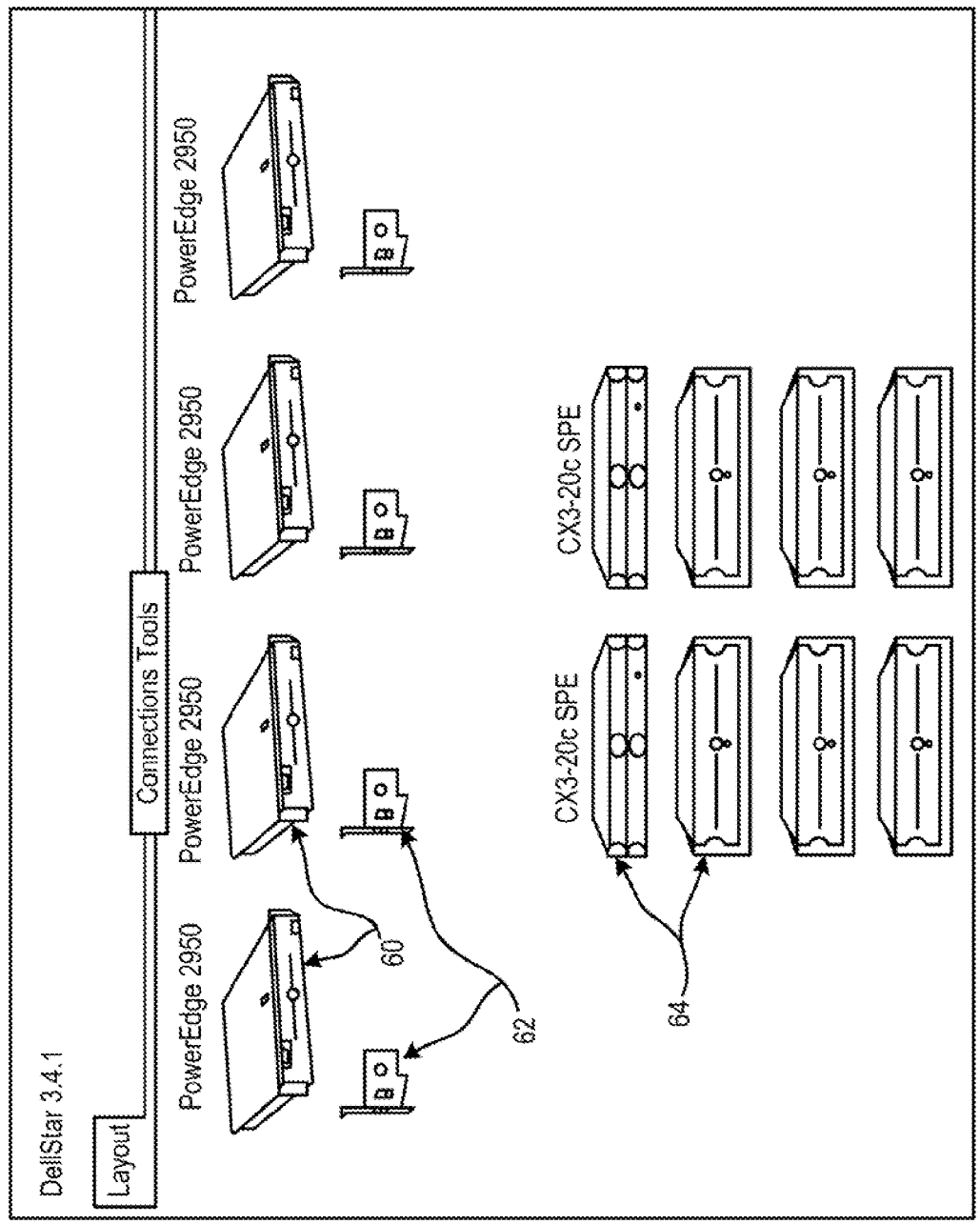
FIG. 4 depicts a graphical user interface of storage devices presented before configuring interconnections.

Referring now to FIG. 4, a graphical user interface is depicted of storage devices presented before configuring interconnections. Plural storage servers 60 are selected with each storage server having a host bus adapter (HBA) 62, such as a Fibre Channel HBA or iSCSI Network Interface Card (NIC). Plural storage devices 64 are selected, such as hard disk drives configured with storage processor enclosures (SPEs). As an example, an end user might select a number of storage devices 64 based on the amount of information storage capacity that is anticipated or the number of storage servers 60 based on the number of accesses to stored information that is anticipated. After selection of storage devices, the end user may attempt to interconnect the storage devices manually or initiate automated configuration of interconnects.

Figure 5:
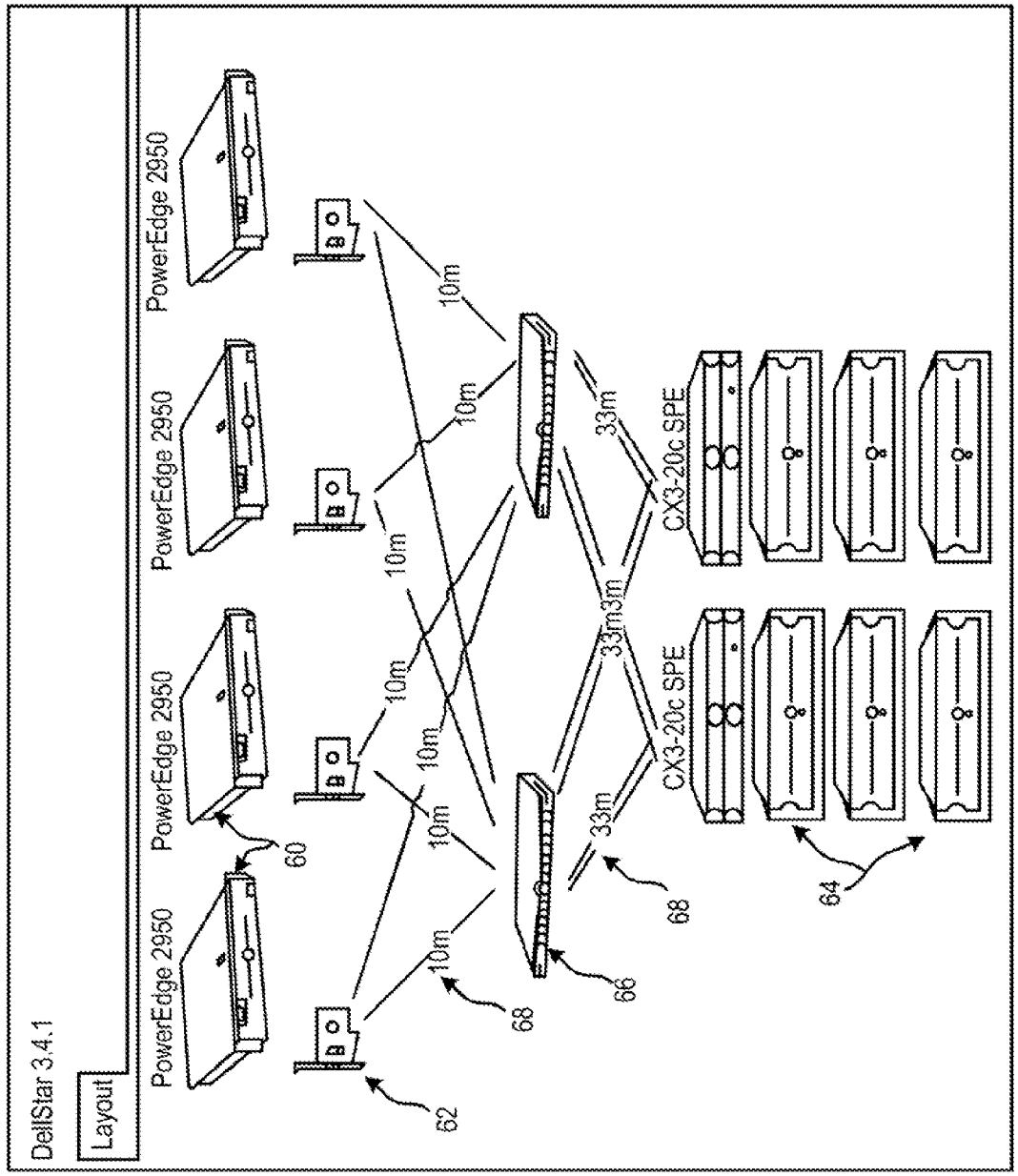
FIG. 5 depicts a graphical user interface of storage devices automatically depicted with interconnection devices.

Referring now to FIG. 5, a graphical user interface is depicted of storage devices 60 and 64 automatically configured with interconnection devices 66 and 68. The storage devices are analyzed to determine the number of ports, type of ports, need for redundancy or other factors in order to automatically determine the interconnection devices, such as the number of switches 66 and the number, type and length of cables 68 used to interconnect devices. For example, a redundant SAN topology will include redundant switches, an iSCSI interconnect will use Ethernet and a Fibre Channel interconnect will use fibre channel cables. The end user can select desired cable colors and lengths which are depicted in the selected colors on the user interface.

Although the present invention has been described in detail, it should be understood that various changes, substitutions and alterations can be made hereto without departing from the spirit and scope of the invention as defined by the appended claims.

What is claimed is:

1. A system for configuring storage device interconnections, the system comprising:
   non-transitory memory storing instructions executable by a processor, the instructions including at least:
   a selector interface operable to accept end user storage device selections from plural available storage devices and plural available storage topologies, the storage device selections including at least interconnection devices, the interconnection devices including at least cables having plural different colors;
   an interconnection engine operable to automatically, in response to the end user storage device selections, apply the storage device selections to determine selected of the interconnection devices for interfacing the selected storage devices; and
   a presentation engine operable to automatically present a graphical image of the selected storage devices interfaced by the selected of the interconnection devices, the presentation automatically in response to the end user storage device selections;
   wherein the selector interface is further operable to accept end user color selections for the color of physical cables from plural available cable colors and the presentation engine is further operable to present the cables at the graphical image with the selected end user color selections.

2. The system of claim 1 wherein the storage topology comprises a storage area network and the interconnection device comprises a switch.

3. The system of claim 1 wherein the storage topology comprises a redundant storage area network and the interconnection device comprises plural switches.

4. The system of claim 1 wherein the interconnection engine is further operable to automatically retrieve a stock keeping unit for each storage device interconnect and interconnection device for use in generating a purchase order for the end user.

5. The system of claim 1 wherein the storage topologies comprise direct attached storage, storage area network nonredundant fabric and storage area network redundant fabric.

6. The system of claim 1 wherein the interconnection devices comprise Fibre Channel cables, Ethernet cables, and Serial Attached SCSI cables.

7. A method for configuring storage device interconnections, the method comprising:
   presenting plural available storage devices and plural available storage topologies to an end user;
   accepting storage device and storage topology selections from the end user;
   automatically in response to the end user selections applying the storage device and storage topology selections to determine interconnection devices for interfacing the selected storage devices, the interconnection devices including at least plural cables, the plural cables available for delivery in plural different colors;
   automatically and without an end user selection of interconnection devices presenting a graphical image of the selected storage devices interfaced by the determined interconnection devices in the selected storage topology;
   accepting a cable color selection made by the end user from plural colors for delivery of cables having the color of the color selection; and
   presenting the graphical image with the cables having the selected color.

8. The method of claim 7 wherein the storage topologies comprise direct attached storage and storage area network.

9. The method of claim 8 wherein the storage area network topology comprises a storage area network nonredundant topology and a storage area network redundant topology.

10. The method of claim 7 further comprising:
    generating stock keeping unit numbers for each of the storage device interconnects and the interconnection devices; and
    applying the stocking keeping numbers to generate an order for the storage devices and interconnection devices.

11. The method of claim 7 wherein the interconnection device comprises a switch.

12. The method of claim 7 wherein the topology comprises a storage area network redundant topology and the interconnection device comprises plural switches.

13. A graphical user interface comprising:
    a display operable to present images, the images including at least:
    plural storage topology selections presented to an end user;
    a storage topology selector operable to accept a storage topology selection from the end user; and
    a graphical image automatically generated in response to the storage topology selection, the graphical image depicting interconnection devices that interconnect storage devices associated with the storage topology without an end user selection of the interconnection devices;
    wherein the interconnection devices comprises a cable, the cable available for selection by an end user in plural different colors, the graphical image having the cable depicted by a color selected by the end user for delivery of physical cables having the selected color.

14. The graphical user interface of claim 13 wherein the storage topology comprises a storage area network and the interconnection device comprises a switch.

15. The graphical user interface of claim 13 wherein the storage topology comprises a redundant storage area network and the interconnection device comprises plural switches.

* * * * *